Feb. 7, 1967  R. SALCEDO GUMUCIO  3,303,055
GAS ELECTRODE FOR A FUEL CELL CONTAINING
RADIOACTIVE MATERIAL
Filed July 21, 1961

INVENTOR:
RICARDO SALCEDO GUMUCIO
BY Irving Holtzman
ATTORNEY.

United States Patent Office 3,303,055
Patented Feb. 7, 1967

3,303,055
GAS ELECTRODE FOR A FUEL CELL CONTAINING RADIOACTIVE MATERIAL
Ricardo Salcedo Gumucio, Madrid, Spain, assignor to Yardney International Corp., New York, N.Y., a corporation of New York
Filed July 21, 1961, Ser. No. 125,780
6 Claims. (Cl. 136—120)

This invention relates to a multilayer gas electrode and more particularly to a multilayer gas electrode suitable for use in a fuel cell. It has particular application to a multilayer silver electrode which may be employed as an oxygen electrode in a fuel cell.

It is common practice in the fuel cell art to employ gas electrodes wherein the skeleton material of the electrode is composed of material of homogeneous porosity. This construction has several disadvantages which are manifested during the operation of the cell. When the size of the pores are small, the gas diffusion rate through the electrode from gas side to electrolyte side is slow. On the other hand, when the pore size is large, the gas bubbles contacting the electrolyte are also large thus cutting down the effective contact area between electrolyte and gas. These two effects manifest themselves in the relatively poor performance of the cell.

It has now been found that these disadvantages may be avoided by providing the electrode with a multilayer construction wherein the pore size varies progressively from relatively large pores on the gas side of the electrode to relatively fine pores on the electrolyte side of the electrode. Under these circumstances the gases flowing from the gas side of the electrode to the electrolyte side rapidly enter the large pores and pass therethrough. On their way through the electrode, the gas bubbles encounter smaller pores and become progressively smaller so that when the gases eventually reach the fine pores and electrolyte they are in minutely divided form and present an overall large surface-contact area.

It has been further found, in accordance with the present invention, that the performance of the above electrode may be further improved by incorporating therein a radioactive-isotope-bearing material. The radiations therefrom serve to catalyze the electrode reactions of the fuel cell. The combination of the multilayer pore construction and the radioisotope impregnation results in an electrode that is highly useful and effective.

It is therefore an important object of the present invention to provide an electrode of the above mentioned type which is highly useful and effective in a fuel cell.

Other and more detailed objects will be apparent from the following description and the accompanying drawing wherein.

Figure 1:
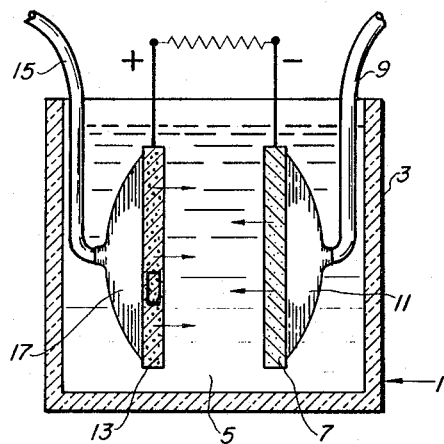
FIG. 1 is a cross-sectional view of a fuel cell embodying the present invention.

According to FIG. 1, a fuel cell embodying the present invention is shown at 1 and comprises a housing 3 and electrolyte 5. The electrolyte may vary with the particular fuel electrode employed or the air or oxygen electrode described in more detail below. In the embodiment shown in the drawing the electrolyte resorted to is an aqueous alkali-metal hydroxide of about 10 to 50% concentration (e.g. aqueous KOH). A 44% aqueous KOH solution has been found to be quite suitable.

The fuel electrode of the fuel cell 1 is shown at 7 and is disposed in contact with a fuel-supply line 9 which ends in an enlarged terminal portion 11. The fuels and the skeleton structures which support the fuels in the case where the fuel electrode is a gas electrode may vary considerably. The fuel electrode may be example be a hydrogen electrode, hydrocarbon electrode, carbon monoxide electrode, natural-gas electrode, alcohol and/or aldehyde electrode, metal electrode etc.

In the embodiment illustrated in the drawing the fuel electrode is a hydrogen electrode and comprises a porous nickel skeleton through which hydrogen gas may diffuse. This fuel electrode may be impregnated with a radioactive isotope which will catalyze the electrode reaction. In the construction illustrated in the drawing the radioisotope utilized is Ni 63. Other radioisotopes, described more in detail below, may also be incorporated in this electrode in place of the Ni 63.

The construction of the fuel electrode 7 may be of the conventional type or may have a progressively smaller pore distribution from the fuel or gas side to the electrolyte side of the electrode. This is described more in detail below in connection with the oxygen or air electrode.

The air or oxygen electrode of fuel cell 1 is shown at 13. It is similar in general construction to the fuel electrode 11, having an air- or oxygen-supply line 15 which ends in an enlarged terminal portion 17 adjacent the oxygen electrode. The latter may be fabricated from a variety of material. Exceptionally good results are obtained with electrodes made of silver, carbon or copper. In the preferred form of this invention, electrode 13 also contains a radioactive isotope which catalyzes the electrode reaction.

Figure 2:
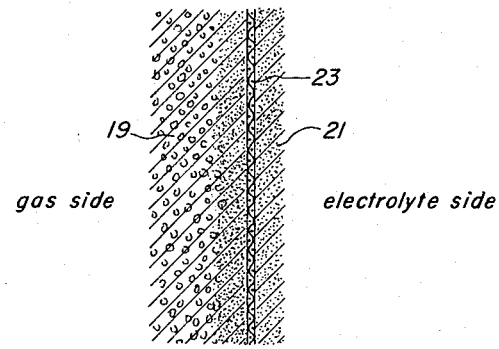
FIG. 2 is an enlarged view of the section marked off in dotted line on the oxygen electrode in FIG. 1.

As mentioned above, the oxygen or air electrode is a multilayered electrode of progressively varying degrees of porosity. The number of layers constituting the electrode may vary from case to case depending upon the particular requirements. In the embodiment of the invention illustrated in the drawing and best seen in FIG. 2, the electrode 13 is a silver electrode having a layer 19 made from relatively large particles on the gas side of the electrode and a layer 21 of relatively small particles. A nickel wire mesh 23 is embedded in the electrode for support. Exceptionally good results are obtained with silver particles for layer 19 of the order of 7 to 9 microns in size and with silver particles of the order of 2 microns in size for layer 21.

In general the multilayer electrode is prepared by placing an open work conductive support in the bottom of a mold. Layers of particulate material suitable for use as a skeleton for the oxygen electrode are then built up in the mold. The particle size of the material used in the various layers varies progressively from layer to layer. Pressure is then applied to the material in the mold of sufficient magnitude to form a layered structure. This structure is then preferably sintered. Suitable for this purpose, particularly with the use of particulate silver, is a sintering temperature of about 700° C. for 5 to 10 minutes.

As mentioned above, either the fuel electrode or the air or oxygen electrode may have incorporated therein a radioisotope-bearing material. A variety of radioisotopes or their compounds (e.g. salts, oxides, hydroxides) may be resorted to for this purpose. By way of example the following radioisotopes may be mentioned: carbon 14, nickel 63, silicon 32, cobalt 60, polonium 210, promethium 147, Sr 90, Te 99. The level of radiation of the electrode will also vary with the different requirements. A radiation level ranging from about 100 microcuries up to 1 curie and higher per square centimeter of electrode surface is adequate for the present purposes.

The following example is further illustrative of the present invention and describes a method of making the multilayered silver oxygen electrode employed in the embodiment of the invention illustrated in the drawing.

*Example*

4.7 grams superfine (2-micron size) silver is spread in a mold of 1.625" x 1.750" surface. 9.7 grams of ordinary silver powder of 7–9 microns in size is spread on top. Nickel mesh is placed on the bottom of the mold to reinforce the plate. A total pressure of about 10,000 lbs. is applied and the electrode is sintered at 700° C.

1 cc. of promethium chloride from alcoholic solution (activity 200 microcuries/cc.) is applied on the side of the superfine silver. After evaporation of alcohol at 50° C., a layer of polyvinyl alcohol (5% water solution) is applied by dipping or by brush. The electrode is allowed to activate over a period of about 1 week in an oven at temperatures of about 40° C.

Whereas the invention has been described with reference to specific forms thereof, it will be understood that many changes and modifications may be made without departing from the spirit of the appended claims.

What is claimed is:

1. An electric-current-generating fuel-cell electrode for sustaining an electrode reaction of a gas fed into said electrode at an interface of said electrode with an electrolyte, said electrode comprising a coherent porous body having a gas-entrance side and an electrolyte-contacting side, said porous body consisting of at least two distinct layers respectively disposed along said sides and bonded together, said layer including a first layer consisting essentially of relatively coarse particles of a material selected from the group consisting of silver, carbon and copper, and a second layer consisting essentially of relatively fine particles of said material; and a radioactive substance in at least one of said layers and present in substantially 100 microcuries to 1 curie per cm.$^2$ of said body.

2. An electric-current-generating fuel-cell electrode for sustaining an electrode reaction of a gas fed into said electrode at an interface of said electrode with an electrolyte, said electrode comprising a coherent porous body having a gas-entrance side and an electrolyte-contacting side, said porous body consisting of at least two distinct layers respectively disposed along said sides and bonded together, said layers including a first layer consisting essentially of relatively coarse particles of a material selected from the group consisting of silver, carbon and copper, and a second layer consisting essentially of relatively fine particles of said material; and a radioactive substance dispersed throughout only said second layer and present in substantially 100 microcuries to 1 curie per cm.$^2$ of said body.

3. An electric-current-generating fuel-cell electrode for sustaining an electrode reaction of a gas fed into said electrode at an interface of said electrode with an electrolyte, said electrode comprising a coherent porous body having a gas-entrance side and an electrolyte-contacting side, said porous body consisting of at least two distinct layers respectively disposed along said sides and bonded together, said layers including a first layer consisting essentially of relatively coarse particles having a particle size of substantially 7 to 9 microns of a material selected from the group consisting of silver, carbon and copper and a second layer consisting essentially of relatively fine particles of a particle size on the order of 2 microns of said material; and a radioactive substance in at least one of said layers and present in substantially 100 microcuries to 1 curie per cm.$^2$ of said body.

4. An electric-current-generating fuel-cell electrode for sustaining an electrode reaction of a gas fed into said electrode at an interface of said electrode with an electrolyte, said electrode comprising a coherent porous body having a gas-entrance side and an electrolyte-contacting side, said porous body consisting of at least two distinct layers respectively disposed along said sides and bonded together, said layers including a first layer consisting of relatively coarse particles having a particle size of substantially 7 to 9 microns of silver and a second layer consisting of relatively fine particles of a particle size on the order of 2 microns of said material; a radioactive substance dispersed throughout only said second layer and present in substantially 100 microcuries to 1 curie per cm.$^2$ of said body; and a mesh of nickel wire imbedded in said second layer substantially coextensive therewith.

5. An electrode as defined in claim 4 wherein said radioactive substance is impregnated into said second layer, further comprising a layer of polyvinyl alcohol covering at least said electrolyte-contacting side of said porous body.

6. An electric-current-generating fuel cell comprising an oxygen-gas electrode, a fuel electrode and an alkaline electrolyte and an electrolyte in contact with both said electrodes, said oxygen-gas electrode comprising a coherent porous body having a gas-entrance side and an electrolyte-contacting side, said porous body consisting of at least two distinct layers respectively disposed along said sides and bonded together, said layers including a first layer consisting essentially of relatively coarse particles having a particle size of substantially 7 to 9 microns of a material selected from the group consisting of silver, carbon and copper and a second layer consisting essentially of relatively fine particles of a particle size on the order of 2 microns of said material; and a radioactive substance dispersed throughout only said second layer and present in substantially 100 microcuries to 1 curie per cm.$^2$ of said body.

References Cited by the Examiner

UNITED STATES PATENTS

| | | | |
|---|---|---|---|
| 1,182,513 | 5/1916 | Thofehrn | 136—26 |
| 1,217,739 | 2/1917 | Flannery | 136—146 |
| 2,615,932 | 10/1952 | Marko et al. | 136—122 |
| 2,654,795 | 10/1953 | Brill et al. | 136—120 |
| 2,776,331 | 1/1957 | Chapman | 136—75 |
| 2,914,596 | 11/1959 | Gorin et al. | 136—120 |
| 2,938,064 | 5/1960 | Kordesch | 136—122 |
| 2,947,797 | 8/1960 | Justi et al. | 136—120 |
| 3,019,358 | 1/1962 | Ohmart | 136—100 |
| 3,020,327 | 2/1962 | Ruetschi | 136—120 |
| 3,035,998 | 5/1962 | Sommer et al. | 136—120 |
| 3,097,974 | 7/1963 | McEvoy et al. | 136—120 |
| 3,101,285 | 8/1963 | Tantram et al. | 136—120 |

FOREIGN PATENTS

| | | |
|---|---|---|
| 233,847 | 3/1960 | Australia. |
| 1,094,831 | 12/1960 | Germany. |
| 19,161 | 1910 | Great Britain. |

JOHN H. MACK, *Primary Examiner.*

JOHN R. SPECK, S. H. PARKER, W. VAN SISE,
*Examiners.*